United States Patent
Santos

(10) Patent No.: US 8,546,966 B1
(45) Date of Patent: Oct. 1, 2013

(54) CONTINUOUS MOTION FLUID FLOW TORQUE GENERATOR

(76) Inventor: Miguel Radhames Santos, Wurtsboro, NY (US)

( * ) Notice: Subject to any disclaimer, the term of this patent is extended or adjusted under 35 U.S.C. 154(b) by 153 days.

(21) Appl. No.: 13/199,789

(22) Filed: Sep. 9, 2011

Related U.S. Application Data

(60) Provisional application No. 61/403,606, filed on Sep. 17, 2010.

(51) Int. Cl.
 *F03B 13/12* (2006.01)

(52) U.S. Cl.
 USPC .............................................. 290/43; 290/54

(58) Field of Classification Search
 USPC ................... 290/43, 44, 54, 55; 415/4.1, 47, 415/127, 147; 416/41, 198 R
 See application file for complete search history.

(56) References Cited

U.S. PATENT DOCUMENTS

| | | | |
|---|---|---|---|
| 6,692,230 B2 | 2/2004 | Selsam | |
| 7,540,705 B2 * | 6/2009 | Emshey | 415/4.1 |
| 8,350,396 B2 * | 1/2013 | Dempster | 290/43 |
| 2004/0047733 A1 | 3/2004 | Gasendo | |
| 2010/0213716 A1 * | 8/2010 | Santoro | 290/54 |
| 2010/0329841 A1 * | 12/2010 | O'Neil | 415/4.1 |

FOREIGN PATENT DOCUMENTS

JP          355051970 A          4/1980

* cited by examiner

*Primary Examiner* — Tho D Ta
(74) *Attorney, Agent, or Firm* — Sandra M. Kotin

(57) ABSTRACT

A fluid flow torque generator unit is composed of an impeller assembly, a housing, and a supporting frame. The housing contains one half of the impeller assembly and is configured to divide the force of the oncoming fluid flow into three components which work together to increase the force on the front of the impellers and to create a suction effect on the back of the impellers increasing torque output. One unit powering an electric generator can produce sufficient electricity for residential or commercial use. One unit or multiple units working together can be incorporated into an assembly that includes a source of compressed air to provide an air flow when the wind subsides, insuring a continuous output of electricity. The basic unit operates equally well in response to underwater currents. The dimensions and number of units are determined by the fluid flow source and the desired output.

21 Claims, 7 Drawing Sheets

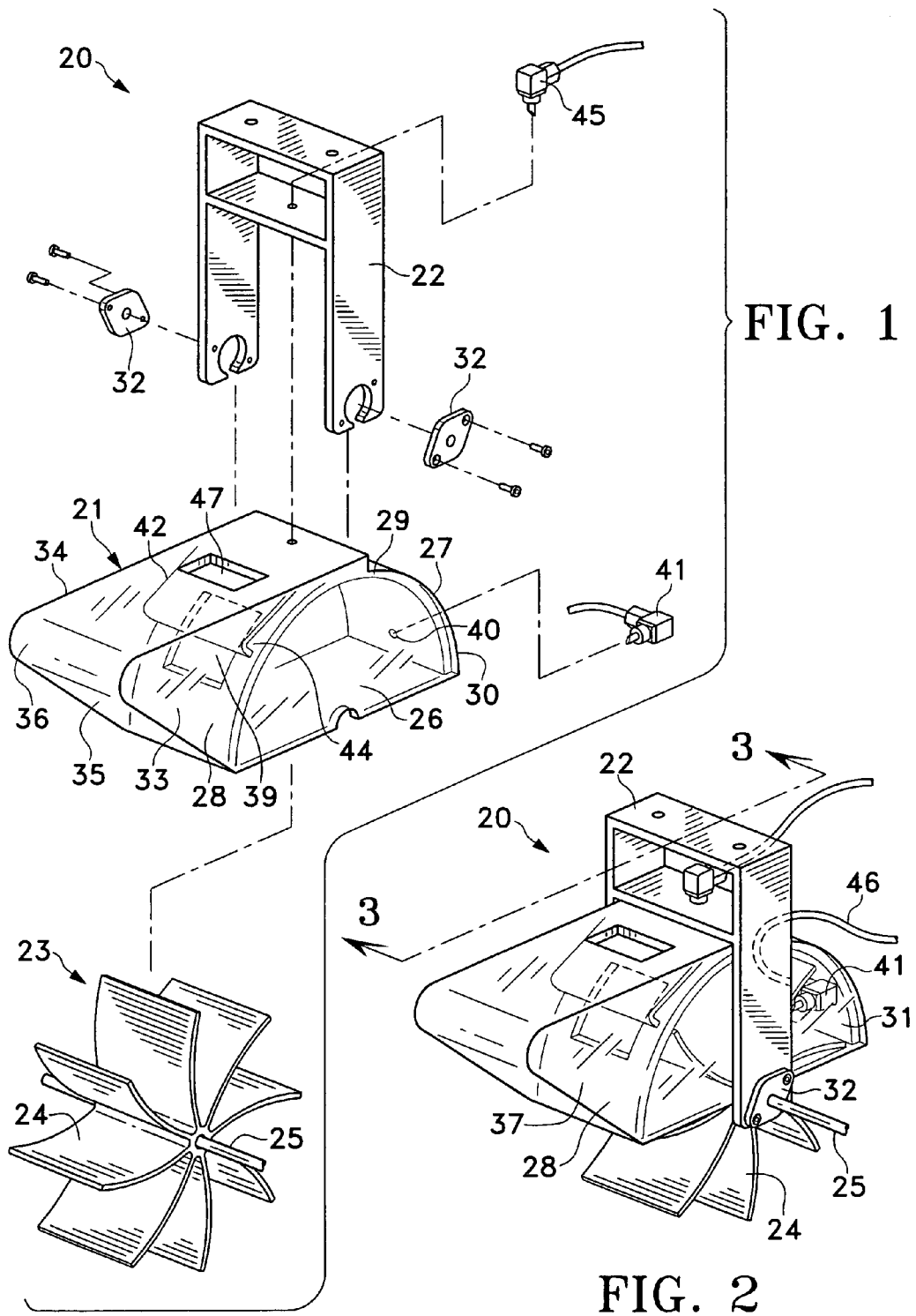

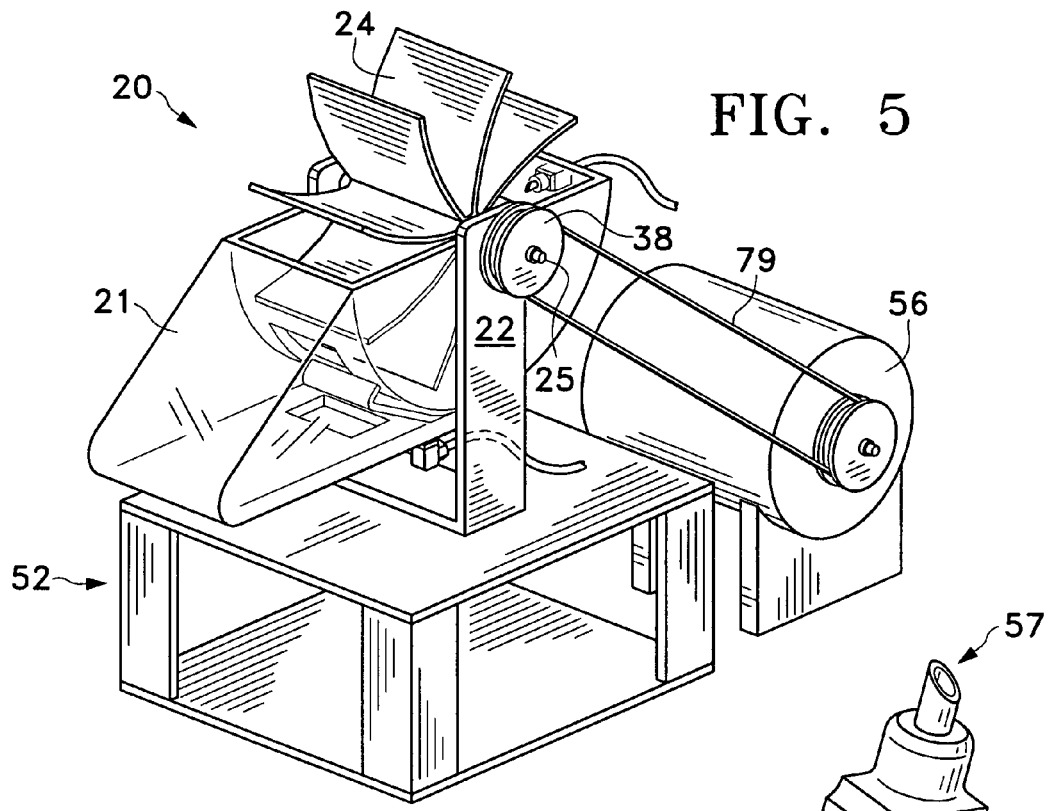
FIG. 5
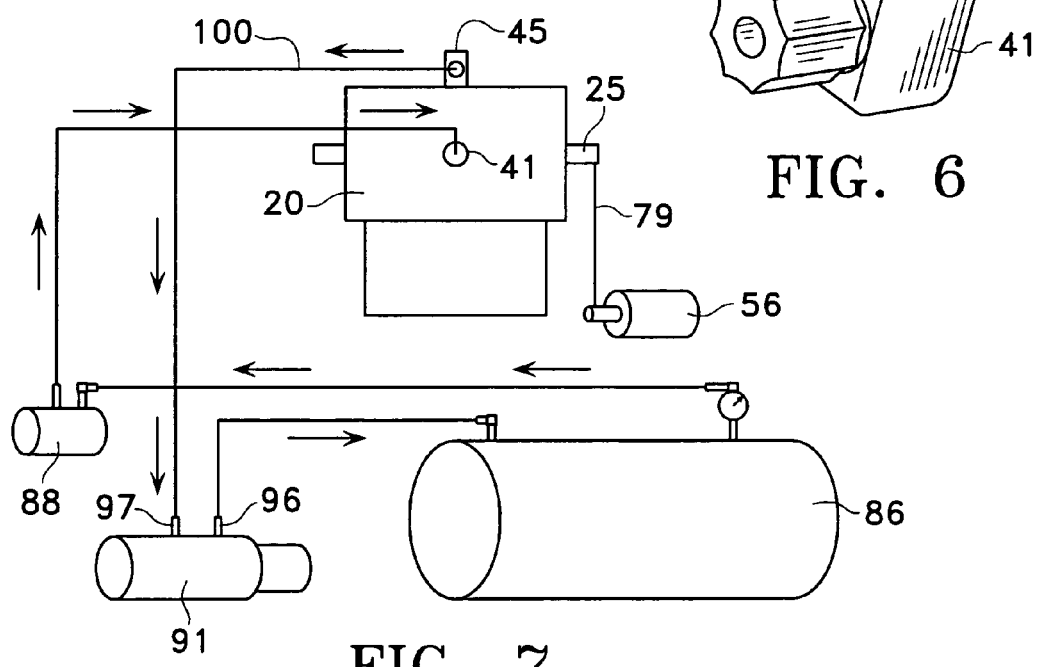
FIG. 6
FIG. 7

CONTINUOUS MOTION FLUID FLOW TORQUE GENERATOR

This patent application contains the same subject matter disclosed in Provisional Patent application Ser. No. 61/403,606 filed on Sep. 17, 2010.

FIELD OF THE INVENTION

The instant invention relates to a fluid flow torque generator that can utilize an auxiliary system to maintain continuous motion of the impellers when the fluid flow subsides.

BACKGROUND OF THE INVENTION

Man has utilized the power of moving air and water since the beginning of recorded time. The harnessing of wind power to perform a variety of tasks has become increasingly more sophisticated. Since the last century wind power has been utilized to generate electricity on a large scale. The familiar three bladed wind generators are often installed in considerable numbers and arranged over large land areas where the wind blows during most of the year. Such "windmills" are often built in many different sizes and may face in different directions so that at least a portion of the wind generators is always rotating. These wind generators may also be seen off shore in many countries. The goal of producing a better wind generator has created a glut of ideas that encompass a variety of designs and a range of sizes. Many of the designs disclose several rotors in a single generating assembly.

In U.S. Pat. No. 6,692,230, Selsam teaches a multi-rotor wind turbine that is pivotally rotatable by means of a turntable system located at the top of an elevated support means or tower. The wind turbine consists of a series of rotors mounted along a single 'horizontal' shaft. The rotors are sufficiently spaced apart so as not to create any disturbance or other interference with each other. The generator is substantially centered on the shaft directly over the pivot point with rotors both fore and aft of the generator. A number of embodiments are disclosed in which the pitch of the shaft is varied from horizontal to tilt at various angles. The angle may be fixed or adjustable. The number of rotors on each side of the generator may be the same or there may be more rotors forward of the generator or more rotors aft of the generator. The rotors may have three blades or two blades and the whole shaft, mounted on the turntable, may turn with the wind in the manner of a weather vane. More than one shaft assembly may be mounted on a single turntable. In another embodiment the two parts of the shaft rotate independently in opposite directions driving two counter-rotating halves of a load.

A very different system is taught by Emshey in U.S. Pat. No. 7,540,705, wherein the multi-blade turbine is set at ground level. The turbine is mounted within a half shroud supported in a frame having a central rotatable shaft and outer arms supported on motorized wheels so that the frame can rotate about a circular track according to the wind direction. A second half shroud nests within the first and can be rotated to close over the turbine according to weather conditions. The turbine itself has a central shaft mounted longitudinally within the shroud. A series of arcuate blades are arranged in rows about the shaft with each row of blades spaced to be offset from the adjacent rows. A covered inlet vane is attached to the shroud to assist in directing the flow of fluid tangentially past the upper exposed turbine blades. Two such turbine assemblies can be connected along a common axis on either side of a single load device or generator.

A multi-unit wind generator supported on a horizontal platform mounted at the top of a tower is disclosed by Gasendo in Patent Application Publication No. 2004/0047733. A frame is attached to the platform and includes two or more horizontal shafts, each with at least one blade assembly. Each such blade assembly unit includes a ratchet bearing so that when the blades of one unit are activated by the wind the ratchet bearing engages and rotates the shaft while the other units are free and will not engage the shaft and will not induce drag. Each unit has four angled blades. As each shaft rotates it cooperates with a pulley and belt which in turn cooperates with another pulley which rotates another shaft. The torque is ultimately transported to a speed multiplier gear and then to the generator. The generator may be attached to the platform or may be located at ground level wherein a vertical shaft transmits the torque.

Another ground level multi-unit wind powered rotary device was disclosed by Furukawa in Japanese Patent Application Publication No. S55-051970 that was filed in 1978. This device is supported by a frame having several tiers of blade wheels which are mounted on horizontally rotating shafts. There are five shafts on each of three tiers. Each shaft supports three blade wheels which increase in diameter from front to back to allow the wind to reach each successive blade wheel. Each rotating shaft has two gears that mesh with chains ultimately transferring the torque to an output shaft. The frame is mounted on wheels enabling it to rotate about a central support shaft. The support shaft is turned by a motor connected to a wind direction detector such that the face of the frame is always turned into the wind.

All of the prior art systems are capable of generating electricity as long as the wind is blowing. None provide any means to rotate the blades when there is no wind. None disclose a housing design which separates the oncoming wind or fluid flow into components, each having a positive effect on the blade rotation. There is a need for a wind powered torque generating system that can be operational even when the wind subsides. There is a need for an efficient wind powered torque generator that can be operative as a single unit, in multiple units working together, in a variety of sizes, and that has the capability of continuous operation. There is a need for such a system that has an auxiliary source of compressed air that can be activated when there is no wind so that the system is in constant operation with no lag in the supply of electricity. There is a need for a fluid flow torque generator housing design that can create more than one path for the same oncoming flow of fluid to increase its effect on the blade rotation and torque output.

BRIEF SUMMARY OF THE INVENTION

The present invention provides a basic fluid flow torque generator unit designed to create more than one path for an oncoming fluid flow which cumulatively effects the impeller rotation and torque output and a wind powered torque generator assembly incorporating at least one basic unit and including an auxiliary compressed air booster system which maintains the impellers in rotation when the wind subsides resulting in no decline in torque output.

It is an object of the present invention is to provide a wind powered torque generator unit that is configured to direct the force of the oncoming wind into specific components each contributing to produce a maximum torque output.

Another object of the present invention is to provide a wind powered torque generator assembly that operates efficiently and has an auxiliary compressed air system enabling continuous operation even when the wind subsides.

A further object of the present invention is to provide a wind powered torque generator assembly that enables a vacuum source to be utilized to assist the rotation of the impellers when the auxiliary compressed air system is activated.

It is another object of the present invention to have an efficient wind powered torque generator assembly utilizing a series of individual wind powered torque generator units working together to supply a cumulative torque output.

Another object of the present invention is to provide a wind powered torque generator assembly having a variable pulley system that can be exchanged to take best advantage of the wind availability.

A still further object of the present invention is to utilize the basic torque generator unit for additional fluid flow operations such as in response to under-water currents and motion.

A still further object of the present invention is to provide a fluid flow torque generator assembly that can be constructed of a variable number of individual units according to the site resources and the desired output.

A further object of the present invention is to provide a wind powered torque generator assembly wherein the air flow to the individual units is adjustable to achieve a maximum output when the auxiliary compressed air system is employed.

A still further object of the present invention is to provide a fluid flow torque generator unit configured to utilize the Venturi effect created by one fluid flow component to assist the rotation of the impellers and prevent reverse rotation.

Another object of the present invention is to provide a fluid flow torque generator assembly that mimics the Venturi effect when the auxiliary system is employed.

The present invention is a fluid flow torque generator that comprises an impeller assembly that includes a series of impellers and a rotatable shaft, a housing having two chambers, a first chamber being substantially semicircular and configured to contain one half of the impeller assembly with minimal tolerances on all sides while permitting free rotation of the impellers, and a substantially triangular second chamber disposed forward of the first chamber and sharing a common wall with it. There is an opening in the common wall. The second chamber has a substantially horizontal first leg and a second leg forming a forward extending apex facing the fluid flow and an aperture in the first leg disposed substantially over the opening. Both of the chambers have coextensive planar sidewalls, and the housing is configure to fragment the fluid flow into three components each having a positive effect on the rotation the impellers. The effects are cumulative. There is also a frame to support the housing, means in cooperation with the frame to support the shaft and assist the shaft in smooth rotation and means to transfer the torque generated by the rotation of the shaft to an electric generator.

The present invention is also a fluid flow torque generator which comprises an impeller assembly having at least eight substantially rectangular impellers equidistantly affixed along one edge to a rotatable shaft, the shaft extending beyond the width of the impellers on both sides and a housing comprising two chambers. A first chamber is substantially semicircular and configured to contain one half of the impeller assembly with minimal tolerances on all sides while permitting free rotation of the impellers, the first chamber comprising a curved member having a forward portion, a mid portion and a rearward portion and two planar side walls. A substantially triangular second chamber is disposed forward of the first chamber and comprises a substantially horizontal first leg, a canted forward second leg, a third leg formed from the forward portion and a part of the mid portion of the curved member and functioning as a partition between the two chambers, and two planar side walls being coextensive with the side walls of the first chamber, the junction of the first leg and the second leg forming an apex of the triangle with the apex angle designated angle A. The housing also has a substantially rectangular opening in the partition between the two chambers, a plate baying side edges and being disposed within the second chamber, one end of the plate being affixed to a rear portion of the first leg, the plate extending over substantially one half of the rectangular opening and having a downward facing flange that abuts the partition on both sides of the rectangular opening, the side edges of the plate being contiguous with the side walls of the second chamber such that narrow passage is formed between the plate and the partition, the narrow passage opening into the first chamber through the rectangular opening and an aperture in the first leg disposed directly over the plate. There is a frame supporting the housing on both planar sides, means in cooperation with the frame to support the shaft and to assist the shaft in smooth rotation and means to transfer the torque produced by the rotation of the shaft to an electric generator. A flow of fluid toward the housing is divided into three components, a first component directed straight into the impellers, a second component directed along the second leg and into the impellers whereby the direction and velocity of the second component are altered according to the apex angle and a third component directed straight along the first leg across the aperture producing a Venturi effect within the second chamber resulting in suction that pulls on the backs of the impellers through the rectangular opening, all three components contributing to the rotation of the impellers and thereby enhancing the production of torque.

The present invention also includes a continuous motion wind powered generator assembly that comprises at least one wind powered torque generator unit comprising an impeller assembly having at least eight substantially rectangular impellers equidistantly affixed along one edge to a rotatable shaft, the ends of the shaft extending beyond the width of the impellers on both sides. There is a housing having two chambers, a first chamber being substantially semicircular and configured to contain one half of the impeller assembly with minimal tolerances on all sides while permitting free rotation of the impellers, the first chamber comprising a curved member having a forward portion, a mid portion and a rearward portion and two planar side walls, and a substantially triangular second chamber disposed forward of the first chamber and comprising a substantially horizontal first leg, a canted second leg, a third leg formed from the forward portion and a part of the mid portion of the curved member and functioning as a partition between the two chambers, and two planar side walls being coextensive with the side walls of the first chamber. The junction of the first leg and the second leg form an apex of the triangle. There is a substantially rectangular opening in the partition between the two chambers, a plate disposed within the second chamber, one end of the plate being affixed to a rear portion of the first leg, the plate extending over substantially one half of the rectangular opening and having a downward facing flange that abuts the partition on both sides of the rectangular opening, the side edges of the plate being contiguous with the side walls of the second chamber such that a narrow passage is formed between the plate and the partition, the narrow passage opening into the first chamber through the rectangular opening and an aperture in the first leg disposed directly over the plate. The housing is designed to fragment the oncoming wind into three components which together have a cumulative effect on the rotation of the impellers. There is a frame supporting the housing on both planar sides and means in cooperation with the frame to support the shaft and to assist the shaft in smooth rotation, the shaft extending beyond the means and the frame on both sides. The assembly includes at least one electric generator, means to transfer torque produced by the rotation of the shaft to the at least one electric generator, an air compressor having an air input port and an air output port, at least one compressed air storage tank having an inlet and an outlet, and means to conduct compressed air from the air output port to the at least one compressed air storage tank inlet. There is a first nozzle mounted through the rearward portion of the curved member and being in communication with the first chamber such that a flow of compressed air through the nozzle is directed to a central portion of the impellers, means to conduct compressed air from the at least one compressed air storage tank outlet to the first nozzle, a second nozzle mounted in the top of the housing and being in communication with the narrow passage, means to conduct air from the second nozzle to the air input port of the air compressor, and means to activate the air compressor. When there is sufficient wind the impellers are rotated by the cumulative effect of the three components generating torque which is transferred to the at least one electric generator and when there is no wind the air compressor is activated and the compressed air flows to the at least one compressed air tank, to the first nozzle, and through the first nozzle to rotate the impellers while the air compressor pulls air from the second nozzle and from the narrow passage thereby creating suction within the narrow passage and through the rectangular opening in the partition to pull on the impellers from behind thereby enhancing the rotation and the torque produced and the impellers are maintained in continuous rotation.

There is a multi-unit continuous motion wind powered generator assembly that comprises a plurality of wind powered torque generator units each comprising an impeller assembly having at least eight substantially rectangular impellers equidistantly affixed along one edge to a rotatable shaft, the shaft extending beyond the width of the impellers on both sides, a housing having two chambers, a first chamber being substantially semicircular and configured to contain one half of the impeller assembly with minimal tolerances on all sides while permitting free rotation of the impellers, and a substantially triangular second chamber disposed forward of the first chamber and sharing a common wall with it and an opening in the common wall, the second chamber having a forward extending apex facing the oncoming wind. The housing is configured to fragment the oncoming wind into three components, each having a positive effect on the rotation of the impellers, the effects being cumulative. The units also have a frame supporting the housing on two opposing sides, means in cooperation with the frame to support the shaft and assist the shaft in smooth rotation, and means to transfer torque generated by the rotation of the shaft. The assembly includes a main frame to hold and support the frames of the plurality of units, a base to support the main frame, at least one main shaft to which the torque generated by each unit is transferred, an electric generator, and means to transfer the torque from the at least one main shaft to the electric generator. Also included in the assembly is an air compressor having an air input port and an air output port, air storage means having an inlet and an outlet, means to conduct compressed air from the air compressor output port to the air storage means inlet. A first nozzle mounted through a rearward wall of the first chamber of each of the plurality of units is in communication with the first chamber for delivery of compressed air directly to the impellers with means to conduct compressed air from the air storage means outlet to the first nozzle of each of the plurality of units. A second nozzle is mounted in the top of the housing of each of the plurality of units and is in communication with a narrow passage within the second chamber disposed over the opening in the common wall, through which air can be withdrawn creating suction to pull on the impellers from behind with means to conduct air from the second nozzle of each unit to the air input port of the air compressor and means to activate the air compressor. When there is wind the impellers are rotated by the cumulative effect of the three components of the wind and when there is no wind the air compressor is activated and the compressed air is directed to the impellers so that the impellers are maintained in continuous motion.

The present invention also discloses a fluid flow torque generator which comprises an impeller assembly having a series of substantially rectangular impellers equidistantly affixed along one edge to a rotatable shaft, the shaft being longer than the width of the impellers on both sides, said impellers having a front face and a rear face, a housing having two chambers, a substantially semicircular first chamber configured to contain substantially one half of the impeller assembly with minimal tolerances on all sides while permitting free rotation of the impellers, and a substantially triangular second chamber disposed forward of the first chamber and extending forwardly therefrom. The first chamber comprises a curved member and two planar side walls. The second chamber comprises a substantially horizontal first leg, a canted second leg, and a third leg being a portion of the curved member, the portion forming a partition between the two chambers, and planar side walls that are coextensive with the side walls of the first chamber. There is an opening in the partition and an aperture in the horizontal first leg. The housing is configured to divide the force of the oncoming fluid flow into three components, a first component directed to the front face impellers, a second component directed along the canted second leg causing a change in direction and velocity and thereby force and is thereafter directed into the front face of the impellers, and a third component that is directed along the horizontal first leg and over the aperture thereby creating a Venturi effect within the second chamber resulting in a pulling on the rear face of the impellers through the opening and preventing the impellers from rotating in reverse. The effects of the three components are cumulative. There is a frame to support the housing, means in cooperation with the frame to support the shaft and enable the shaft to rotate smoothly, and means to transfer torque from the rotating shaft to an electric generator.

Other features and advantages of the invention will be seen from the following description and drawings.

BRIEF DESCRIPTION OF THE DRAWINGS

FIG. 1 is an exploded front perspective view of a wind powered torque generator unit of the present invention;

FIG. 2 is a front perspective view of the wind powered torque generator unit;

FIG. 5 is a front perspective view of a single unit wind powered torque generator assembly;

FIG. 6 is a perspective view of a compressed air delivery nozzle;

FIG. 7 is a schematic diagram of the air circulating system of the auxiliary compressed air components of a wind powered torque generator assembly;

DETAILED DESCRIPTION OF THE INVENTION

Figure 3:
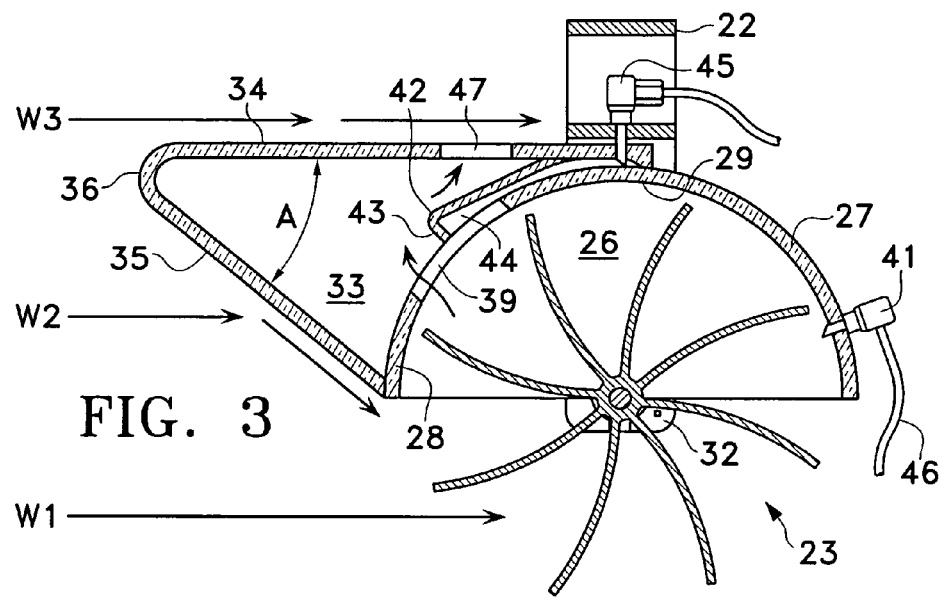
FIG. 3 is a sectional view through line 3-3 of FIG. 2.

The basic wind powered torque generator unit of the present invention may be utilized to power an electric generator to provide the electricity for residential or commercial use either in combination with an external electricity supplier or as the sole source of electricity. One basic unit may be used alone or two or more basic units may be combined in a variety of arrangements to aggregate the torque produced for a maximum electrical output. The wind powered torque generator unit 20 may be made in a range of sizes, specifically determined by the available wind source, whether a single unit is to be used or a number of units are to be utilized in an aggregate system, and the targeted output. It may be constructed of any strong, rigid material that can be formed into the required shapes and that can withstand both the wind and the constant exposure to the elements. To insure a continuous supply of electricity, the wind powered torque generator unit of the present invention may be equipped with an auxiliary system to maintain output even when there is no wind.

The basic unit 20 may consist of a housing 21 supported within a frame 22, an impeller assembly 23 including a series of impellers 24 affixed to a rotatable shaft 25 and a means to transfer the torque to an electric generator. The auxiliary system may provide a source of compressed air or other form of air flow to maintain rotation of the impellers 24 when there is no wind. There may also be means to turn the frame 22 to insure that the impellers 24 are always facing directly into the wind.

An improvement to the efficiency of the unit 20 may depend upon the design of the housing 21 which may be divided into two chambers. The first chamber 26, which may face away from the wind, may be substantially semicircular with a curved wall 27 that includes a front portion 28, a mid portion 29 and a rear portion 30, and two planar side walls 31. The first chamber 26 may be dimensioned to contain one half of the impeller assembly 23 with just enough clearance such that the impellers can rotate freely with minimal tolerances all around. Affixed to the exterior of the front of the first chamber 26 may be a substantially triangular second chamber 33 having a horizontal roof leg 34 and an adjacent front wall leg 35, the forward ends of which together form the apex 36 of the triangle. The apex may be rounded and the apex angle A may be from 20° to 45°, with an angle of 30° being optimal. The front portion 28 of the curved wall 27 and substantially one half of the mid portion 29 may form the third leg of the triangle. The rearward facing end of the roof leg 34 may be contiguous with the mid portion 29 and the rearward facing end of the front wall leg 35 may abut the lower edge of the front portion 28. See FIGS. 1 and 3. In construction, the roof leg 34 and/or the front wall leg 35 may be curved to maximize the effects of the wind sweeping along their surfaces.

The second chamber 33 may also have planar side walls 37 which may be coextensive with the planar side walls 31 of the first chamber 26. The front portion 28 and part of the mid portion 29 of the curved wall 27 of the first chamber 26 may form a partition between the two chambers. There may be a substantially rectangular first opening 39 in the front portion 28 and a small second opening 40 in the rear portion 30 of the semicircular wall 27 into which a first nozzle 41, through which the compressed air is introduced, may be mounted.

A cover plate 42 within the second chamber 33 may extend downward from the rearward end of the roof leg 34 and may cover substantially the upper half of the rectangular opening 39. The cover plate 42 may be substantially flat with a downward facing end flange 43 that lifts the plate 42 slightly above the surface of the front portion 28 of the curved wall 27. The outer portions of the bottom edges of the flange 43 may abut the sides of the rectangular opening 39 and the side edges of the cover plate 42 may be contiguous with the side walls 37 of the second chamber 33. (FIGS. 1, 2 and 3)

The cover plate 42, the outer surface of the mid portion 29 of the semicircular wall 27 and the side walls 37 of the second chamber 33 may enclose a narrow passage 44 with its open end directly over the rectangular opening 39. A second nozzle 45 may be disposed on the top of the housing 21 and may communicate with the narrow passage 44. There may be an aperture 47 in the roof leg 34 of the second chamber 33 situated over the cover plate 42. See FIG. 3.

Figures 4A, 4B, 4C:
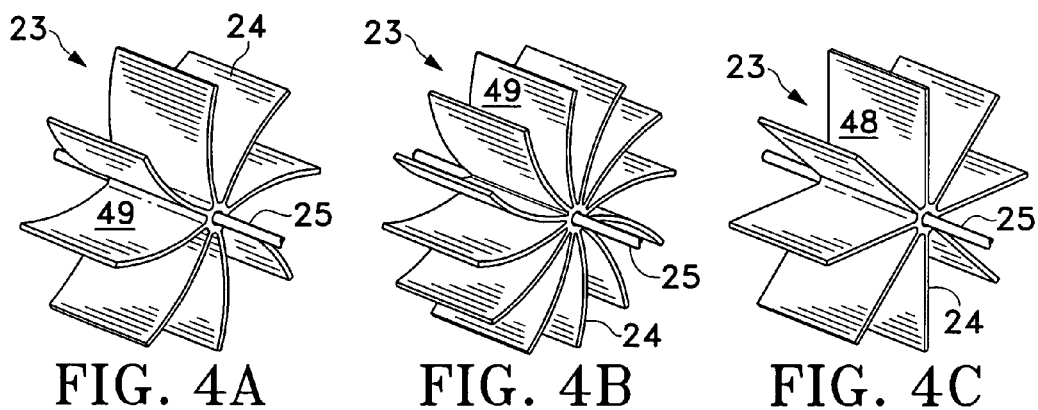
FIG. 4A is a perspective view of an impellor assembly having eight curved impellers.
FIG. 4B is a perspective view of an impellor assembly having twelve curved impellers.
FIG. 4C is a perspective view of an impellor assembly having eight flat impellers.

The impeller assembly 23 may consist of a rotatable shaft 25 to which may be permanently mounted a series of substantially rectangular impellers 24. The impellers 24 may be flat 48 (FIG. 4C) or they may be curved 49. (FIGS. 4A and 4B) A curved impeller may provide greater pushing and pulling effects than the flat impeller. The number of impellers equidistantly arranged about the shaft 25 may be optional with eight (FIGS. 4A and 4C) impellers as a minimum. Twelve impellers are illustrated in FIG. 4B. A greater number of impellers may provide optimal output. When a larger number of impellers is utilized the space between the outer end of an impeller and the edge of the housing may be essentially closed so that no air may be lost, thereby making maximum use of all air entering the housing 21.

The rotatable shaft 25 may be supported by two bearings 32, one mounted on each side of the frame 22 as seen in FIGS. 1 and 2. The bearings 32 may allow the shaft 25 to rotate smoothly and efficiently with a minimum of friction. Alternatively, bushings or other means may be used for smooth rotation of the shaft 25. The shaft 25 may supply torque directly to the electric generator 56, or it may be connected to the generator 56 through a T-drive 83 to translate the horizontal rotation to vertical rotation. The use of the T-drive 83 may depend upon the placement of the electric generator with respect to the generator unit 20. A gear box, not illustrated, may be interposed between the shaft and the electric generator to increase torque and/or rpm output.

The housing 21 may be mounted over the impeller assembly 23 covering its upper half to protect it from the elements as illustrated in FIGS. 2 and 3. If there is an additional cover over the wind powered torque generator, the housing 21 may be mounted under the impeller assembly 23 covering its lower half (FIG. 5). There may be no operational advantage to either mounting.

To maximize the performance of the wind powered torque generator unit 20, it may be oriented so that the apex 36 of the triangular second chamber 33 faces directly into the wind. To understand the design of the housing 21, the wind may be viewed as being divided into three components as may be seen in FIG. 3. Component W1 may be straight into the impellers, component W2 may be straight into the front wall leg 35 of the triangular second chamber 33 where it is directed along the front wall leg 35 such that the velocity and force are altered according to the apex angle, and component W3 may be straight over the roof leg 34 of the second chamber 33 and across the aperture 47 in the roof leg 34.

Component W1 may have the expected effect on the impellers 24, i.e., to cause them to rotate. The second component W2 may be deflected along the inclined surface of the front wall leg 35 and into the impellers 24 presenting a second force component to rotate the impellers. The angle of deflection may increase the force of component W2 and provide an additional impetus to the impellers 24. As noted above, the apex angle A formed by the two legs of the triangular second chamber 33 may optimally be 30° to obtain the maximum effect from W2. Additionally, as component W3 sweeps over the horizontal roof leg 34 and across the aperture 47 in the roof leg 34, the Venturi effect of the streaming air current may pull air from the second chamber 33 causing suction or a partial vacuum within the second chamber 33 that may create a pulling effect on the impellers 24 through the rectangular opening 39 in the partition between the first and second chambers. This suction effect may provide still further assist to a smooth and efficient rotation of the impellers 24. The partial vacuum may also insure that the impellers 24 cannot rotate in the reverse direction.

Figure 14:
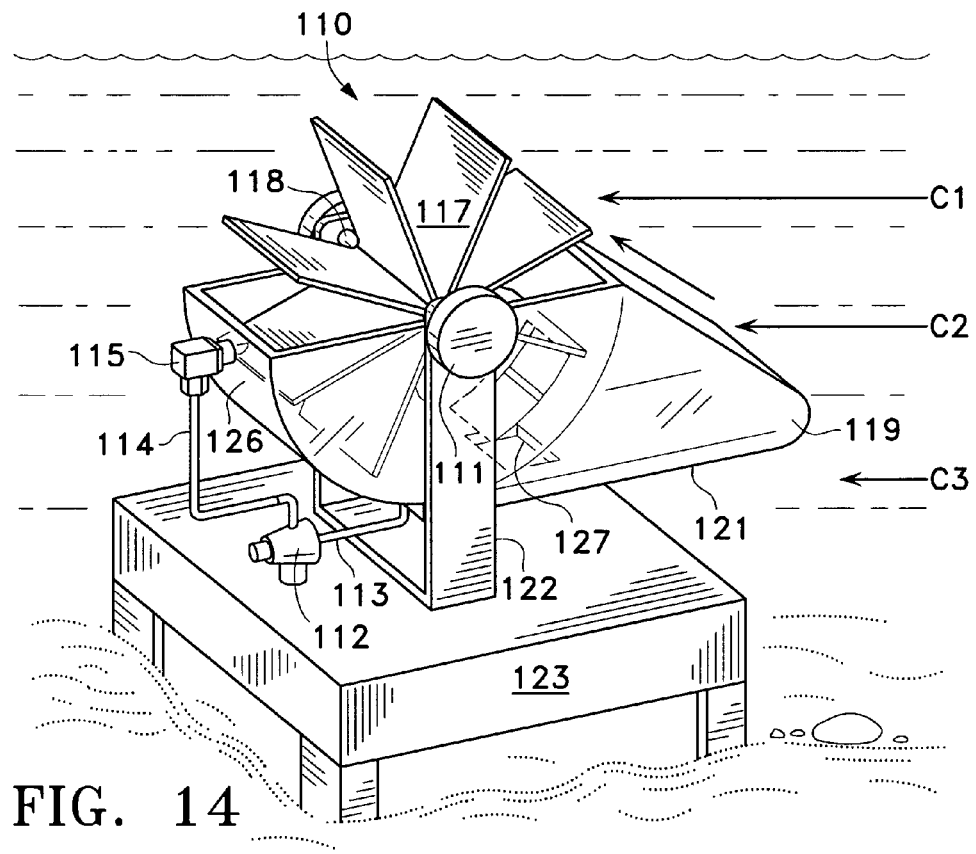
FIG. 14 is a rear perspective view of an underwater fluid flow torque generator assembly of the present invention.

When the wind subsides or dies down completely the rotation of the impellers may be maintained by the auxiliary compressed air system. The compressed air may be supplied to the wind powered torque generator unit 20 through a tube 46 which may be connected to the first nozzle 41 mounted in the rear portion 30 of the curved wall 27. The exit port 57 of the first nozzle 41 may be cut diagonally (FIG. 6) and oriented to concentrate the air flow directly to the center of the impellers 24. The activation of the auxiliary compressed air system maybe accomplished manually or automatically by means well known in the art. A single wind powered torque generator unit 20 may be sufficient to generate electricity for residential or commercial use. The dimensions of the impellers 24 may be determined by the desired output which may also be determinative of the overall size of the unit 20. FIG. 5 may be illustrative of a single basic wind powered torque generator unit 20 in cooperation with an electric generator 56. The housing 21 supported in its frame 22 may be mounted on a base 52. A pulley 38 in communication with the rotatable shaft 25 and a belt 79 may transfer torque from the shaft 25 to the electric generator 56. There may also be a pulley affixed to each end of the rotatable shaft 25, each activating a separate electric generator. One such arrangement may be seen in FIG. 14.

As illustrated in FIG. 5 there is no means to maintain rotation of the impellers 24 in the absence of wind. The basic unit 20 may be expanded to include the auxiliary system, an air compressor 91 and a compressed air storage tank 86. The auxiliary system may also include a pneumatic motor or air motor 88. This auxiliary system, seen schematically in FIG. 7, may be capable of maintaining some of the same effects as achieved through the combined wind components. The air compressor 91 must intake the air to be compressed. In this case the air inlet port 97 may be connected by hollow tubing 100 to the second nozzle 45 at the top of the unit 20 that communicates with the narrow passage 44 over the rectangular opening 39. The pull from the air compressor 91 may create suction which may mimic the Venturi effect created by wind component W3. The air compressor's air outlet port 96 may be in communication with the compressed air storage tank 86. From the storage tank 86 the compressed air may be routed directly to the wind powered torque generator unit 20 or, as seen in FIG. 7, it may be routed through the air motor 88 which may be activated by the stream of compressed air. When the air motor 88 is used the stream of compressed air passing though the air motor 88 may be utilized to rotate a shaft which may also cooperate with the shaft of the electric generator 56 to increase its torque. This connection is not illustrated. From the compressed air storage tank 86 or from the air motor 88, the stream of compressed air may be directed to the first nozzle 41 mounted in the rear portion 30 of the curved wall 27 of the housing 21. The compressed air passing through the first nozzle is directed into the impellers 24 to rotate the shaft 25. The system contains components that all work together to provide similar advantages to those provided by the wind components. There may also be means to turn the frame 22 of the unit 20 so that the apex 36 always faces directly into the wind.

Though a single basic wind powered torque generator unit 20 with its source of compressed air may be used to generate electricity sufficient for many purposes, a more efficient wind generator may consist of a series of the basic units 20 working together to form a wind powered torque generator assembly 50. The number and arrangement of the individual units 20 as well as the size of the individual units 20 may be dependent upon the physical constraints of the site, the quantity of electricity to be generated, and the force and frequency of the wind. The ensuing discussion describes one embodiment of a wind powered torque generator assembly 50 composed of ten of the basic units 20. This embodiment may be used as an example, but it is in no way limiting, and any number, size and arrangement of the basic units 20 may be utilized.

The wind powered torque generator assembly 50 may incorporate a rigid support system composed of a rotatable main frame 51 and a stationary base 52. The base 52 may be supported on the ground or on any suitable structure. It may be anchored or affixed to the ground or to the structure as needed. The base 52 may take any form sufficient to support the main frame 51, but a suitable base 52 may have a horizontal upper plate 53 and lower plate 54 joined together and supported by a series of vertical struts 55. Typically, the plates may be square and separated to provide sufficient space between them in which to place the electric generator 56 and any other necessary components for a compact arrangement. There may be at least four vertical struts 55, at each of the four corners, and additional vertical struts as may be needed according to the overall size of the base 52 and the weight to be supported.

Figure 8:
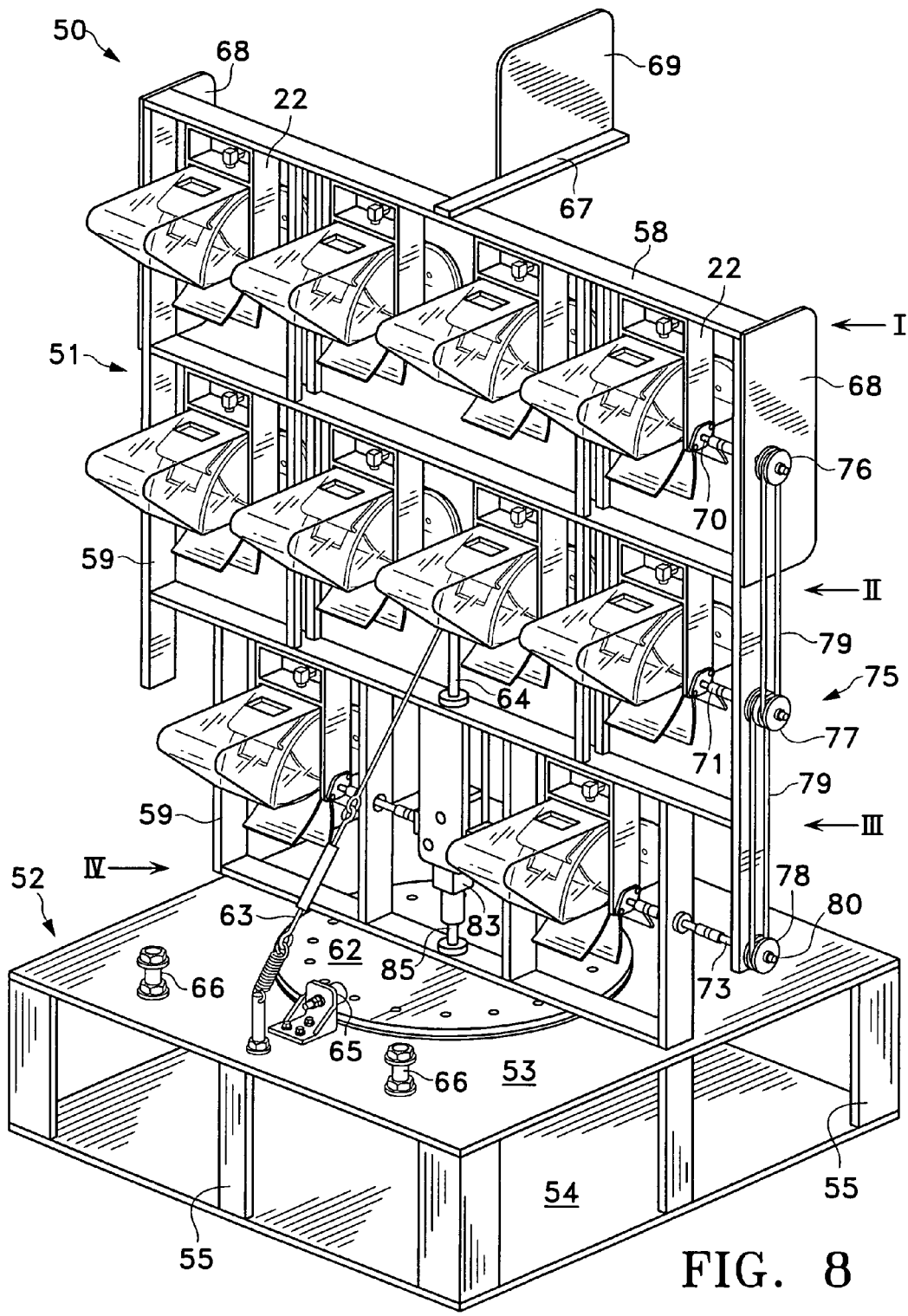
FIG. 8 is a right front right perspective view of a multi-unit wind powered torque generator assembly.
Figure 9:
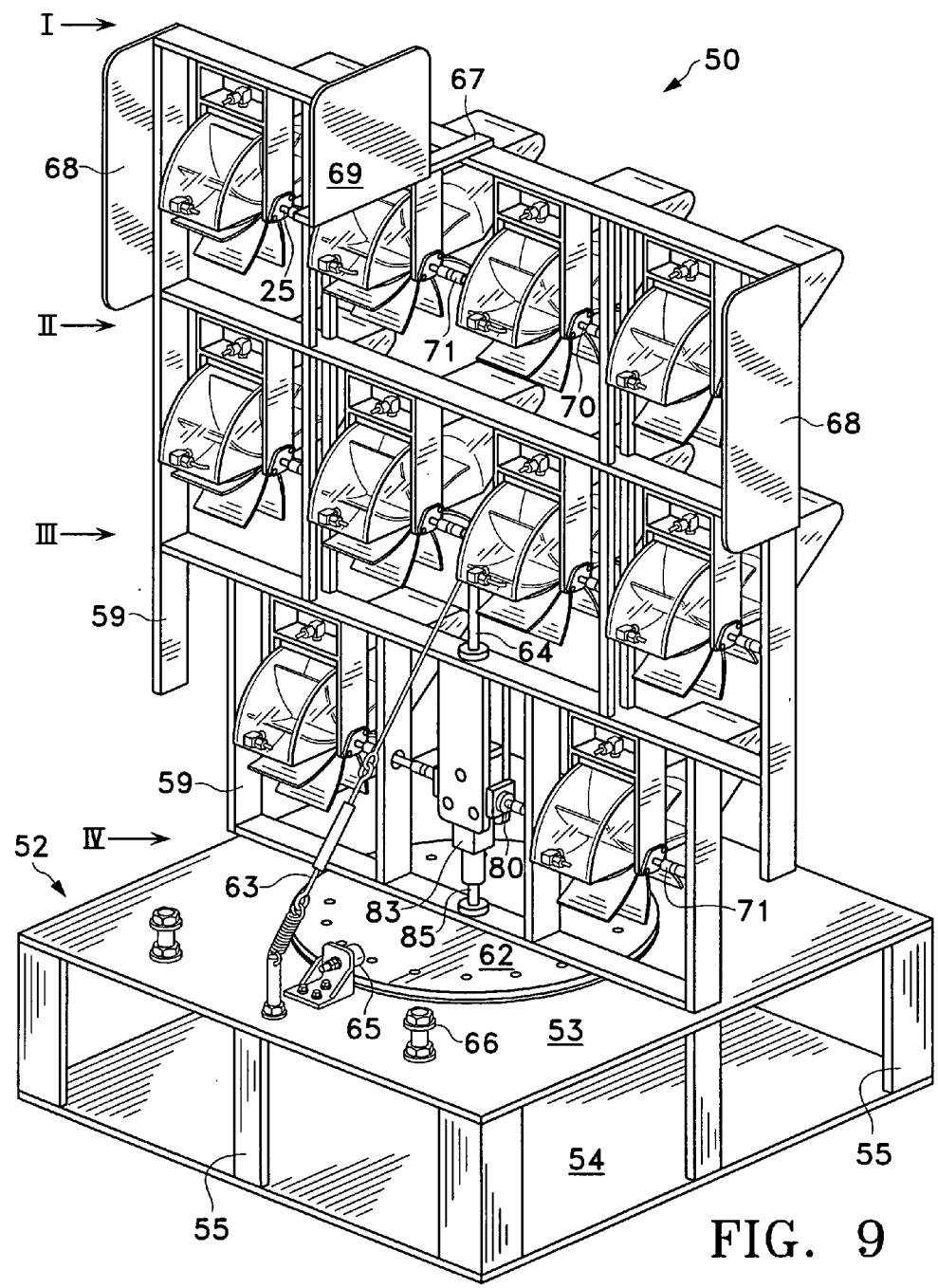
FIG. 9 is a left rear perspective view of a multi-unit wind powered torque generator assembly.

The main frame 51 may be composed of a series of horizontal crossbeams 58 securely attached to vertical side beams 59. Additional intermediate vertical crossbeams 60 may be added as needed. The embodiments illustrated (FIGS. 8 and 9) may have four horizontal crossbeams (I, II, III, and IV—top to bottom). Horizontal crossbeam IV may be attached to a freely rotatable turntable 62 centered on and securely affixed to the top surface of the upper plate 53 of the base 52. This turntable 62 may enable the main frame 51 to turn according to changes in the wind direction. A spring mounted guy wire 63 anchored to the upper plate 53 at two opposing points and guided by a guide post 64 affixed to horizontal crossbeam III may assist in stabilizing the main frame 51. Two opposing horizontal rotatable guides 65 in communication with the turntable 62 and also anchored to the upper plate 53 may insure that the wind cannot disrupt the mainframe 51 by pushing the it off the vertical. Stops 66 may be affixed to the upper plate 53, one on each side of the attachments of the guy wire 63, to prevent the main frame 51 from contacting the guy wire 63 as it turns. When the wind direction changes, a rudder system which may consist of three rudder panels may cause the main frame 51 to turn accordingly. There may be a rearward facing vertical rudder panel 68 affixed to the top of each of the two vertical side beams 59 and a vertically oriented third rudder panel 69 extending rearwardly from the center of horizontal cross beam I. The third rudder panel 69 may be mounted on a horizontal strut 67 to extend it beyond the main frame 51 as shown in FIGS. 8 and 9. The main frame 51 may also be turned automatically by having wind sensors convey wind direction to a computer which may direct a motor to rotate the turntable 62. This technology is well known in the art.

Each of the individual basic units 20 may be mounted within its own frame 22 as described above. These frames 22 may be affixed to the horizontal crossbeams 58 of the main frame 51 to form tiers. In an assembly consisting of ten units 20, there may be four units affixed to crossbeam I forming the first tier, four units affixed to crossbeam II forming the second tier and two units affixed to crossbeam III forming the third tier. The frames 22 of each tier may be evenly spaced across the crossbeam 58 and mounted so that the rotating shafts 25 of each unit 20 may be aligned and joined by couplings 71 to function as a single horizontal shaft 70. Additionally, when the individual rotating shafts 25 are coupled together the impellers of the adjacent units may be set in a staggered order so that the impellers of each unit in the same tier are at a different point in their cycle as the wind components W1 and W2 make contact. The staggered arrangement may be seen in FIG. 9.

When eight impellers are used, as seen in FIGS. 8 and 9, they are separated by 45°. For the units on crossbeams I and II the staggered order seen in FIG. 9 leaves the exposed impeller 24 of each adjacent unit 20 advanced from its neighbor by approximately 11° so that the oncoming air stream may make contact with a different point of the impeller cycle for each unit 20. At any given time the size of the opening between the impeller 24 and the edge of the housing 21 will vary across each tier so there may be no dead spot in the turning sequences.

At one end of the single horizontal shaft 70, on each tier, there may be another coupling to a short shaft 73 that passes through the vertical side beam 59 of the main frame 51. In the embodiments illustrated, this is the vertical side beam on the right side 75. Also, in cooperation with this short shaft 73 may be one or more pulleys. Referring to FIG. 8, there may be one pulley 76 for the uppermost tier associated with cross beam I, two pulleys 77 for the mid tier associated with cross beam II, and one pulley 78 for the lowermost tier associated with cross beam III. Belts 79 or chains may be used to transfer torque from the rotating shafts through the pulleys to a main shaft 80 which in turn may transfer the torque to the electric generator 56. In the embodiments illustrated, the lowermost shaft, associated with cross beam III, may be the main shaft 80 which may transfer all of the torque developed by the assembly 50 to the electric generator 56.

The pulley system utilized with this assembly 50 may control the transfer of torque and may be adjustable for maximum performance as the force of the wind changes. Each of the four pulleys may be exchanged for a pulley of a different diameter and the belts or chains may be changed accordingly. The size ratio of the pulleys may determine the ease of turning or, put another way, how the wind resistance is transferred from the impellers 24 to the rotating shafts 70 and to the main shaft 80. The force of the oncoming wind may determine the particular pulley arrangement which can be altered according to changes in wind intensity.

The alterations in pulley arrangement may be performed manually or they may be accomplished automatically. To do this automatically, sensors may feed wind intensity information to a computer which may then activate the changing mechanism. One such mechanism may be similar to the derailleur system used to change gears on a bicycle. This technology is well known in the art.

Figures 10A, 10B, 10C:
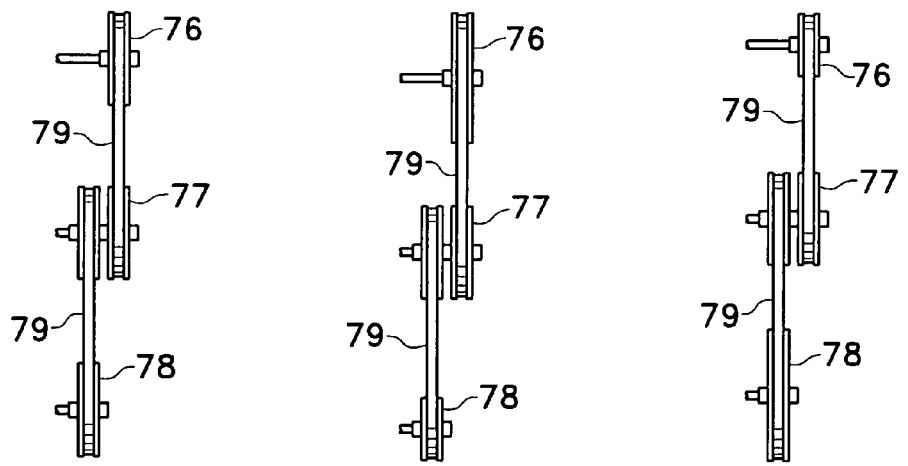
FIG. 10A is a side plan view of an array of pulleys all of which are of the same diameter.
FIG. 10B is a side plan view of an array of pulleys wherein the diameters of the pulleys decrease from top to bottom.
FIG. 10C is a side plan view of an array of pulleys wherein the diameters of the pulleys increase from top to bottom.

The pulley system may be set up in three different arrays, i.e., first, all four pulleys may be the same diameter (FIG. 10A); second, the diameter may decrease from top to bottom, cross beam I to cross beam III, (FIG. 10B); and third, the diameter may increase from top to bottom, cross beam I to cross beaml III (FIG. 10C).

In the first arrangement (FIG. 10A) when all four pulleys are the same diameter, there may be equal resistance on all levels. When the pulley diameters are changed the wind resistance may be increased or decreased equally in all three rows as long as the diameters are the same for all four pulleys. The larger the diameter the less resistance and the easier it may be for the wind to rotate the impellers. This may also be expressed as the larger the moment on the shaft the less torque needed to turn the shaft. Conversely, when all four pulleys are very small a very strong wind may be needed to rotate the impellers.

In the second arrangement (FIG. 10B) where the diameters of the pulleys decreases from top to bottom, different size ratios may be selected with the largest diameter associated with the uppermost tier on cross beam I. The overall effect may be to insure that the uppermost tier of impellers rotate the fastest, and may be the easiest to rotate with the least wind resistance. In the third arrangement (FIG. 10C) where the diameters of the pulleys increases from top to bottom, the impellers associated with the lowermost tier on cross beam III may rotate the fastest and the easiest and those on the uppermost tier may be the hardest to rotate and may offer the most resistance.

The use of the pulley and belt arrangements may insure that the torque from each tier be maximized, ultimately transferred to the single main shaft 80, and from there to the electric generator 56. The shafts on each tier and the main shaft 80 may be oriented horizontally. To transfer torque to the electric generator 56 the main shaft 80 maybe in communication with a T-drive 83 to translate the horizontal rotation to a vertical shaft 85. The use of the T-drive 83 may be a design decision dependent upon the placement of the electric generator 56 with respect to the main shaft 80. As noted above, a gear box (not illustrated) may be interposed between the T-drive 83 and the electric generator 56 to increase total torque output and/or rpm of the wind powered torque generator assembly 50.

The assembly 50 may be equipped for continuous operation with an auxiliary system 90 which may include the air compressor 91 to supply a continuous flow of air to the impellers 24. However, the compressor 91 alone may not be sufficient to provide the most efficient air flow and a single storage tank may not provide a sufficiently adjustable air flow for the multiple unit assembly 50. A cascade 92 of compressed air tanks may be interposed between the air compressor 91 and the individual units 20. The cascade 92 output may be regulated by one or more gauges 89 to provide a constant air pressure to the system and maintain the desired output. The selected output may also depend upon the pulley array in service at the time the auxiliary system 90 is activated. If an automated system is in use, the pulley array may be easily changed to accommodate the auxiliary air supply, or the air supply may be regulated for an optimum result with the pulley array in place.

The pulley array in operation at the time that the auxiliary system 90 is activated may be such that the air flow requirement may not be the same for each unit 20. Rather than changing the pulley array each time the auxiliary system 90 is activated, the compressed air flow to each unit 20 may be adjusted accordingly. The air flow from the cascade 92 may be directed into a manifold 93 from which an individual tube 94 may be directed to each unit 20. The manifold 93 may permit adjustment of air flow to each unit 20 to control or conserve air pressure. This may be accomplished manually or it may be done automatically by computer control. The individual tubes 94 emanating from the manifold 93 may communicate with the first nozzle 41 centered in the rear portion 30 of the curved wall 27 of the housing 21 of each unit 20. As with the single unit assembly, the exit ports 57 of the first nozzles 41 of each unit 20 may be cut at an angle, seen in FIG. 6, and oriented to direct the air flow into the impellers 24 at the precise angle needed to generate the maximum rotation and therefrom the maximum torque.

Figure 11:
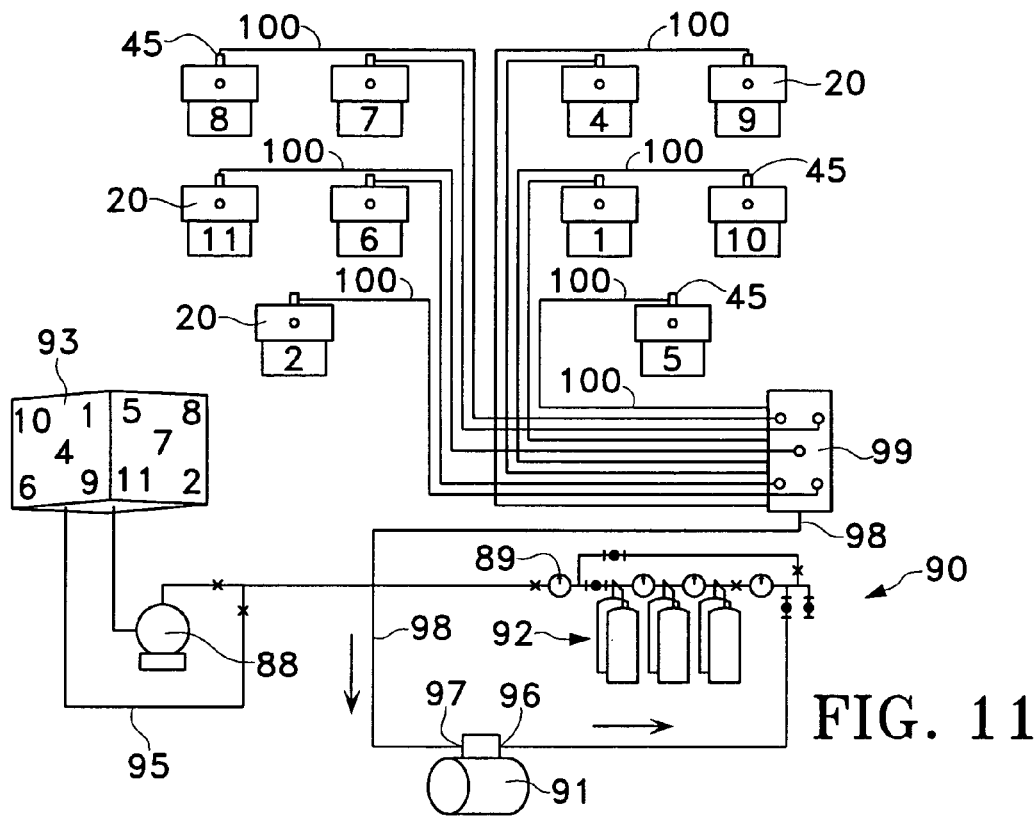
FIG. 11 is schematic diagram of the air suction or vacuum system of the multi-unit wind powered torque generator assembly.
Figure 12:
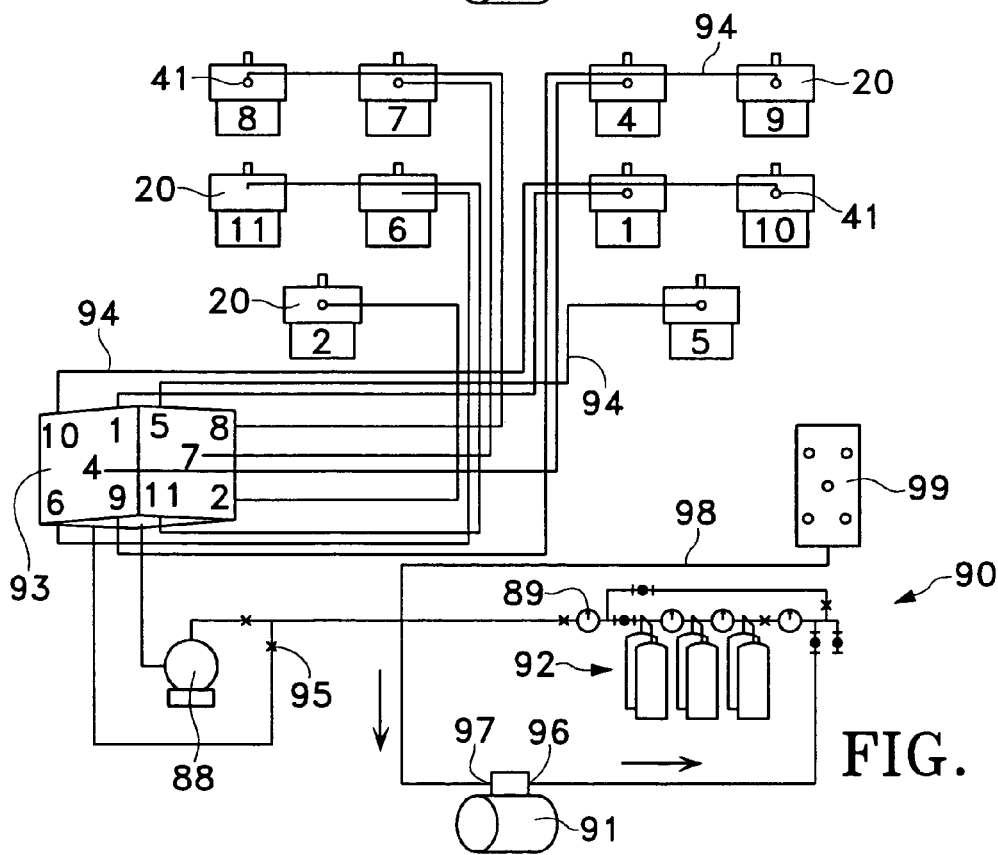
FIG. 12 is schematic diagram of the compressed air system of the multi-unit wind powered torque generator assembly.

As noted above, the air compressor 91 may be the source of air flow when there is little or no wind and the same air compressor 91 may also be utilized to provide additional torque to the electric generator 56 with the inclusion of a pneumatic motor or air motor 88. In this assembly 50, the air motor 88 may be interposed between the compressed air source, the cascade 92, and the compressed air manifold 93. A shaft rotated by the pneumatic motor 88 may cooperate with the shaft of the electric generator 56 to boost its output. This may be accomplished using belts and pulleys or other means known in the art. (Not illustrated) The assembly may be set up so that the air motor 88 may be used or bypassed as needed, seen in FIGS. 11 and 12. The bypass 95 may be activated manually or be automatically controlled by computer.

When the auxiliary system 90 is activated there may be no wind component W3 to produce the Venturi effect which may provide the vacuum or suction needed for the pulling action on the back sides of the impellers 24. The activation of the air compressor 91 may force air out of the air outlet port 96, but it must be taken into the compressor 91 from the reverse side, the air inlet port 97. The air inlet port 97 may be connected to a vacuum chamber 99 by means of the inlet port hose 98. (FIG. 11) Vacuum tubes 100 from the vacuum chamber 99 may extend to each unit 20 and may be connected to the second nozzle 45 at the top of each unit housing 21. The second nozzle 45 may communicate with the narrow passage 44 in each housing 21. When the air compressor 91 is activated air may be pulled from the narrow passage 44 in each unit 20. The outlet from the narrow passage 44 may be directly over the rectangular opening 39 between the first and second chambers of the housing 21 and the vacuum pull through the narrow passage 44 my provide the same pulling or suction effect on the impellers 24 as did the Venturi effect from wind component W3.

Figure 13:
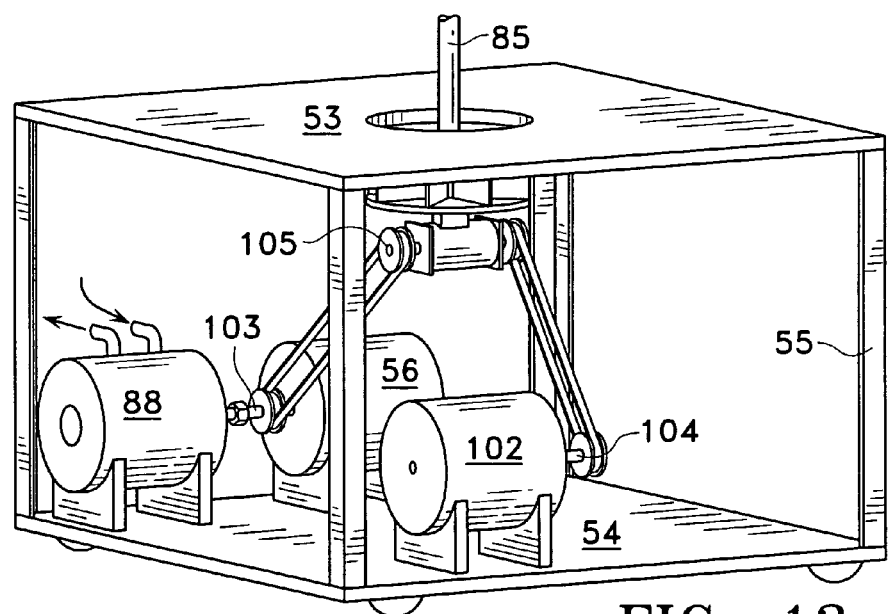
FIG. 13 is a perspective view of the generators and air motor utilized in the multi-unit wind powered torque generator assembly.

Torque directly from the main shaft 80 or from a vertical shaft 85 may also be utilized to power more than one generator. FIG. 13 may illustrate one way this may be accomplished.

More than one AC generator 56 may be activated or, in addition to the AC generator 56, a DC generator 102 may also cooperate with a torque output shaft 105.

If the wind generator assembly is tied into an existing electric grid, when there is no wind the compressor may be activated using electricity obtained from the grid. The compressor may require considerably less electricity then the assembly produces regardless of whether a single unit assembly or a multiple unit assembly is utilized. If the wind generator assembly is not tied into an existing grid, it may be constructed to be totally self-sustaining. One or more rechargeable batteries may be used to power a DC compressor, or using a power converter, an AC compressor. Once started by the batteries, the compressor may be run using a small portion of the electricity generated by the electric generator that is thereafter powered by the assembly as noted above.

Once the impellers are rotated using power from the batteries, the torque may be transferred to both the shaft 103 of the AC generator 56 and the shaft 104 of the DC generator 102 seen in FIG. 13. The DC generator 102 may recharge the batteries (not illustrated) so that they are always available to power up the auxiliary compressed air assembly 90.

The present invention has been generally described as a wind powered torque generator. However, it may be just as advantageous to describe it as a fluid flow torque generator. The basic fluid flow torque generator unit may be adapted for use under water for activation by ocean waves or currents or river currents. The housing 121 may be of the same configuration as the housing 21 used in the air flow or wind powered torque generator. The frame 122 of a water activated unit 110 may be affixed to a base 123 anchored to the floor of the ocean or river. The unit 110 may be just below the water surface or further down in the body of water, depending upon the location of the strongest currents. The unit 110 may be oriented so that the front end, the apex 119 of the housing 121 faces directly into the current which, by the design of the housing 121, may be divided into the three components, C1 directed straight into the impellers 117, C2 directed along the front wall leg 124 at the angle of the leg with the resulting change in velocity, and thereby force, and into the impellers 117. C3 may be directed along the horizontal leg 125 and across the aperture 127 creating the Venturi effect within the housing 121 to provide the pull on the back surface of the impellers 117. See FIG. 14. For underwater generation of electricity a sealed electric generator 111 may be in direct communication with the impeller shaft 118. Two or more under water units 110 may cooperate to form an assembly. (Not illustrated)

Most underwater areas may have generally consistent current flow and no additional assist may be needed. Where there may be fluctuations in the current, a sealed motor and water pump 112 may be utilized. The sealed motor and water pump 112 may be affixed to the base 123 below the unit 110. The pump 112 may create suction which may be utilized through input tube 113 to pull water through a nozzle affixed through the second chamber of the housing 121 to draw water out from the narrow passage. The pump discharge tube 114 may force water through a discharge nozzle 115 into the first chamber 126 of the housing where it may be directed at the impellers 117 just as the compressed air nozzle 41 directs the stream of compressed air at the impellers 24 in the wind generator unit 20. In cases where an assist is needed to activate the impellers a sealed battery system and DC generator may be utilized.

With reference to the wind powered torque generator, an air blower can be utilized as a substitute for the compressed air assembly and may function in the same manner as the water pump described above.

While several embodiments of the present invention have been illustrated and described in detail, it is to be understood that this invention is not limited thereto and may be otherwise practiced within the scope of the following claims.

I claim:

1. A fluid flow torque generator comprising:
   an impeller assembly including a series of impellers affixed to a rotatable shaft;
   housing having two chambers, a first chamber being substantially semicircular and configured to contain one half of the impeller assembly with minimal tolerances on all sides while permitting free rotation of the impellers, and a substantially triangular second chamber disposed forward of said first chamber and sharing a common wall therewith, an opening in said common wall, said second chamber having a substantially horizontal first leg and a second leg forming a forward extending apex facing the fluid flow, an aperture in said first leg disposed substantially over the opening, both of said chambers having coextensive planar sidewalls, and said housing configured to fragment the fluid flow into three components each having a positive effect on the rotation of the impellers, said effects being cumulative;
   frame to support the housing;
   means in cooperation with said frame to support the shaft and assist the shaft in smooth rotation; and
   means to transfer the torque generated by the rotation of the shaft to an electric generator.

2. A fluid flow torque generator comprising:
   an impeller assembly having at least eight substantially rectangular impellers equidistantly affixed along one edge to a rotatable shaft, said shaft extending beyond the width of the impellers on both sides thereof;
   a housing comprising:
      two chambers, a first chamber being substantially semicircular and configured to contain one half of the impeller assembly with minimal tolerances on all sides while permitting free rotation of the impellers, said first chamber comprising a curved member having a forward portion, a mid portion and a rearward portion and two planar side walls, and a substantially triangular second chamber disposed forward of said first chamber and comprising a substantially horizontal first leg, a canted second leg, a third leg formed from the forward portion and a part of the mid portion of the curved member and functioning as a partition between the two chambers, and two planar side walls being coextensive with the side walls of the first chamber, the junction of the first leg and the second leg forming an apex of the triangle with the apex angle designated angle A;
      a substantially rectangular opening in the partition between the two chambers;
      a plate having side edges and being disposed within the second chamber, one end of the plate being affixed to a rear portion of the first leg, said plate extending over substantially one half of the rectangular opening and having a downward facing flange that abuts the partition on both sides of said rectangular opening, the side edges of said plate being contiguous with the side walls of the second chamber such that a narrow passage is formed between the plate and the partition, said narrow passage opening into the first chamber through the rectangular opening; and
      an aperture in the first leg disposed directly over the plate;
   a frame supporting the housing on both planar sides;
   means in cooperation with the frame to support the shaft and to assist the shaft in smooth rotation; and
   means to transfer the torque produced by the rotation of the shaft to an electric generator;
      whereby a flow of fluid toward the housing is divided into three components, a first component directed straight into the impellers, a second component directed along the second leg and into the impellers whereby the direction and velocity of the second component are altered according to the apex angle and a third component directed straight along the first leg across the aperture producing a Venturi effect within the second chamber resulting in suction that pulls on the backs of the impellers through the rectangular opening, all three components contributing to the rotation of the impellers and thereby enhancing the production of torque.

3. A fluid flow torque generator as described in claim 2 wherein the apex angle A is between 20° and 45°.

4. A fluid flow torque generator as described in claim 2 wherein the impellers are curved to concentrate the force effects of the oncoming wind to the centers of the impellers.

5. A fluid flow torque generator as described in claim 2 wherein the means to support the shaft and to assist the shaft in smooth rotation comprises two bearings, one affixed to each side of the frame and positioned to accept the two ends of the shaft, the said ends extending beyond the frame and the bearings.

6. A continuous motion wind powered generator assembly comprising:
   at least one wind powered torque generator unit comprising:
      an impeller assembly having at least eight substantially rectangular impellers equidistantly affixed along one edge to a rotatable shaft, the ends of said shaft extending beyond the width of the impellers on both sides thereof;
      a housing having two chambers, a first chamber being substantially semicircular and configured to contain one half of the impeller assembly with minimal tolerances on all sides while permitting free rotation of the impellers, said first chamber comprising a curved member having a forward portion, a mid portion and a rearward portion and two planar side walls, and a substantially triangular second chamber disposed forward of said first chamber and comprising a substantially horizontal first leg, a canted second leg, a third leg formed from the forward portion and a part of the mid portion of the curved member and functioning as a partition between the two chambers, and two planar side walls being coextensive with the side walls of the first chamber, the junction of the first leg and the second leg forming an apex of the triangle, a substantially rectangular opening in the partition between the two chambers, a plate disposed within the second chamber, one end of the plate being affixed to a rear portion of the first leg, said plate extending over substantially one half of the rectangular opening and having a downward facing flange that abuts the partition on both sides of said rectangular opening, the side edges of said plate being contiguous with the side walls of the second chamber such that a narrow passage is formed between the plate and the partition, said narrow passage opening into said first chamber through the rectangular opening and an aperture in the first leg disposed directly over the plate, said housing designed to fragment the oncoming wind into three components which together have a cumulative effect on the rotation of the impellers;

a frame supporting the housing on both planar sides; and means in cooperation with said frame to support the shaft and to assist the shaft in smooth rotation, said shaft extending beyond said means and said frame on both sides thereof;

at least one electric generator;

means to transfer torque produced by the rotation of the shaft to the at least one electric generator, an air compressor having an air input port and an air output port;

at least one compressed air storage tank having an inlet and an outlet;

means to conduct compressed air from the air output port to the at least one compressed air storage tank inlet;

a first nozzle mounted through the rearward portion of the curved member and being in communication with the first chamber such that a flow of compressed air through the nozzle is directed to a central portion of the impellers;

means to conduct compressed air from the at least one compressed air storage tank outlet to the first nozzle;

a second nozzle mounted in the top of the housing and being in communication with the narrow passage;

means to conduct air from the second nozzle to the air input port of the air compressor; and means to activate the air compressor;

whereby when there is sufficient wind the impellers are rotated by the cumulative effect of the three components generating torque which is transferred to the at least one electric generator and when there is wind the air compressor is activated and the compressed air flows to the at least one compressed air tank, to the first nozzle, and through the first nozzle to rotate the impellers while the air compressor pulls air from the second nozzle and from the narrow passage thereby creating suction within the narrow passage and through the rectangular opening in the partition to pull on the impellers from behind thereby enhancing the rotation and the torque produced and the impellers are maintained in continuous rotation.

7. A continuous motion wind powered generator assembly as described in claim 6 further comprising:

an air motor interposed between the compressed air storage tank outlet and the first nozzle such that a flow of compressed air activates the air motor to rotate a shaft and means to transfer rotational torque from said shaft to the at least one electric generator to increase the torque supplied to the at least one electric generator.

8. A continuous motion wind powered generator assembly as described in claim 6 further comprising a compressed air regulator gauge interposed between the outlet and the means to conduct compressed to the first nozzle, said gauge to control the flow of compressed air to the at least one wind powered torque generator unit.

9. A multi-unit continuous motion wind powered generator assembly comprising:

a plurality of wind powered torque generator units each comprising:

impeller assembly having at least eight substantially rectangular impellers equidistantly affixed along one edge to a rotatable shaft, said shaft extending beyond the width of the impellers on both sides thereof;

a housing having two chambers, a first chamber being substantially semicircular and configured to contain one half of the impeller assembly with minimal tolerances on all sides while permitting free rotation of the impellers, and a substantially triangular second chamber disposed forward of said first chamber and sharing a common wall therewith and an opening in the common wall, said second chamber having a forward extending apex facing the oncoming wind, and said housing configured to fragment the oncoming wind into three components, each having a positive effect on the rotation of the impellers, said effects being cumulative;

a frame supporting the housing on two opposing sides;

means in cooperation with said frame to support the shaft and assist the shaft in smooth rotation; and means to transfer torque generated by the rotation of the shaft;

a main frame to hold and support the frames of the plurality of units;

a base to support the main frame;

at least one main shaft to which the torque generated by each unit is transferred;

an electric generator;

means to transfer the torque from the at east one main shaft to the electric generator;

an air compressor having an air input port and an air output port;

air storage means having an inlet and an outlet;

means to conduct compressed air from the air compressor output port to the air storage means inlet;

a first nozzle mounted through a rearward wall of the first chamber of each of the plurality of units and being in communication with the first chamber, said first nozzle being oriented to deliver compressed air directly to the impellers;

means to conduct compressed air from the air storage means outlet to the first nozzle of each of the plurality of units;

a second nozzle, mounted in the top of the housing of each of the plurality of units and being in communication with a narrow passage within the second chamber disposed over the opening in the common wall, through which air can be withdrawn creating suction to pull on the impellers from behind; means to conduct air from the second nozzle of each unit to the air input port of the air compressor; and means to activate the air compressor;

whereby when there is wind the impellers are rotated by the cumulative effect of the three components of the wind and when there is no wind the air compressor is activated and the compressed air is directed to the impellers so that the impellers are maintained in continuous motion.

10. A multi-unit continuous motion wind powered generator assembly as described in claim 9 wherein the air storage means comprises a series of compressed air storage tanks forming a cascade and gauges controls within the cascade for regulation of the flow of compressed air released therefrom.

11. A multi-unit continuous motion wind powered generator assembly as described in claim 9 further comprising a compressed air manifold interposed between the air storage means outlet and the first nozzles and individual controls in the air manifold to regulate the flow of compressed air to each of the first nozzles.

12. A multi-unit continuous motion wind powered generator assembly as described in claim 9 further comprising a vacuum chamber interposed between the means to conduct air from the second nozzle of each unit and the air input port of the air compressor.

13. A multi-unit continuous motion wind powered generator assembly as described in claim 9 further comprising an air motor interposed between the air storage means outlet and the means to conduct compressed air to the first nozzles such that the flow of compressed air activates the air motor to produce rotational torque, and means to transfer the rotational torque from the air motor to the electric generator to increase the torque supplied thereto.

14. A multi-unit continuous motion wind powered generator assembly as described in claim 9 wherein the means to activate the air compressor comprises a DC electric generator, means to activate the DC electric generator, and means to transfer torque from the at least one main shaft to the DC electric generator.

15. A multi-unit continuous motion wind powered generator assembly as described in claim 9 wherein the main frame comprises a series of horizontal cross beams supported by at least two vertical side beam such that the horizontal cross beams form tiers on which the frames of the plurality of units are affixed.

16. A multi-unit continuous motion wind powered generator assembly as described in claim 15 wherein the means to transfer the torque generated by the rotation of the shaft of each unit comprises: couplings to connect the shafts of the units on each tier together so that they rotate as a single shaft, the lowermost shaft functioning as the at least one math shaft to which all torque is transferred;
  a coupling and extender at one end of the single shaft on each tier;
  at least one pulley affixed to each extender, said at least one pulley being rotated by the single shaft; and
  communicating means between the pulleys from one tier to the next to transfer torque from each single shaft to the at least one main shaft;
  whereby the diameters of the pulleys are determined by the wind force needed to rotate the shafts and may be the same or different from one tier to the next and the pulleys may be changed according to the wind force and to obtain maximum torque from the assembly.

17. A multi-unit continuous motion wind powered generator assembly as described in claim 16 wherein the pulleys are all the same size thereby responding in the same way to the wind force.

18. A multi-unit continuous motion wind powered generator assembly as described in claim 16 wherein the pulleys decrease in diameter from the uppermost tier to the lowermost tier such that the impellers on the uppermost tier offer the least resistance and rotate the fastest.

19. A multi-unit continuous motion wind powered generator assembly as described in claim 16 wherein the pulleys increase in diameter from the upper most tier to the lowermost tier such that the impellers on the uppermost tier offer the greatest resistance and rotate the slowest.

20. A multi-unit continuous motion wind powered generator assembly as described in claim 9 further comprising means to turn the main frame according to the direction of the on-coming wind.

21. A fluid flow torque generator comprising:
  an impeller assembly having a series of substantially rectangular impellers equidistantly affixed along one edge to a rotatable shaft said shaft being longer than the width of the impellers on both sides thereof and said impellers having a front face and a rear face;
  a housing having two chambers, a substantially semicircular first chamber configured to contain substantially one half of the impeller assembly with minimal tolerances on all sides while permitting free rotation of the impellers, and a substantially triangular second chamber disposed forward of said first chamber and extending forwardly therefrom; said first chamber comprising a curved member and two planar sidewalls and said second chamber comprising a substantially horizontal first leg, a canted second leg and a third leg being a portion of said curved member, said portion forming a partition between the two chambers, and planar side walls coextensive with the side walls of the first chamber, an opening in the partition and an aperture in the horizontal first leg, said housing configured to divide the force of the oncoming fluid flow into three components, a first component directed to the front face of the impellers, a second component directed along the canted second leg causing a change in direction and velocity and thereby force and is thereafter directed into the front face of the impellers, and a third component directed along the horizontal first leg and over the aperture thereby creating a Venturi effect within the second chamber resulting in a pulling on the rear face of the impellers through the opening and preventing the impellers from rotating in reverse, the effects of said three components being cumulative;
  frame to support the housing;
  means in cooperation with said frame to support the shaft and enable the shaft to rotate smoothly; and
  means to transfer torque from the rotating shaft to an electric generator.

* * * * *